United States Patent
Mu

(10) Patent No.: US 12,262,324 B2
(45) Date of Patent: Mar. 25, 2025

(54) HARQ FEEDBACK METHOD AND APPARATUS, AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 696 days.

(21) Appl. No.: 17/617,568

(22) PCT Filed: Jun. 10, 2019

(86) PCT No.: PCT/CN2019/090581
§ 371 (c)(1),
(2) Date: Dec. 8, 2021

(87) PCT Pub. No.: WO2020/248100
PCT Pub. Date: Dec. 17, 2020

(65) Prior Publication Data
US 2022/0240189 A1    Jul. 28, 2022

(51) Int. Cl.
*H04W 72/23*     (2023.01)
*H04L 1/1812*    (2023.01)
*H04L 5/00*      (2006.01)
*H04W 52/02*     (2009.01)
*H04W 72/1263*   (2023.01)

(52) U.S. Cl.
CPC ....... *H04W 52/0235* (2013.01); *H04L 1/1812* (2013.01); *H04L 5/0053* (2013.01); *H04W 52/0216* (2013.01); *H04W 72/1263* (2013.01); *H04W 72/23* (2023.01)

(58) Field of Classification Search
CPC ......... H04W 52/0219; H04W 52/0235; H04W 72/1263
USPC ........................ 370/318, 329, 311, 310, 350
See application file for complete search history.

(56) References Cited

U.S. PATENT DOCUMENTS

| | | | |
|---|---|---|---|
| 12,207,313 B2 * | 1/2025 | Chen | H04W 74/0841 |
| 2021/0243763 A1 * | 8/2021 | Zhou | H04L 1/1671 |
| 2021/0306951 A1 * | 9/2021 | Hwang | H04W 52/0219 |
| 2022/0077960 A1 * | 3/2022 | Lee | H04W 72/0446 |
| 2022/0085939 A1 * | 3/2022 | Mondal | H04W 72/21 |
| 2022/0109528 A1 * | 4/2022 | Babaei | H04W 72/04 |
| 2022/0131630 A1 * | 4/2022 | Ghozlan | H04W 24/02 |
| 2022/0149922 A1 * | 5/2022 | Wang | H04W 76/19 |
| 2022/0225428 A1 * | 7/2022 | Xiong | H04L 1/1864 |
| 2022/0256587 A1 * | 8/2022 | Fujishiro | H04W 76/27 |
| 2022/0312406 A1 * | 9/2022 | Kim | H04L 1/1861 |

FOREIGN PATENT DOCUMENTS

CN    107113725 A    8/2017

OTHER PUBLICATIONS

International Patent Application No. PCT/CN2019/090581 International Search Report dated Mar. 6, 2020, 2 pages.

* cited by examiner

*Primary Examiner* — Joseph Arevalo
(74) *Attorney, Agent, or Firm* — Cozen O'Connor

(57) ABSTRACT

An HARQ feedback method and an HARQ feedback apparatus. The method includes: receiving a power saving signal, the power saving signal being configured to indicate the terminal to perform a power saving related action; and performing HARQ feedback based on a receipt result of the power saving signal.

19 Claims, 4 Drawing Sheets

HARQ FEEDBACK METHOD AND APPARATUS, AND STORAGE MEDIUM

CROSS-REFERENCE TO RELATED APPLICATION

This application is a U.S. national phase of International Application No. PCT/CN2019/090581, filed with the State Intellectual Property Office of P. R. China on Jun. 10, 2019, the entire content of which is incorporated herein by reference for all purposes.

TECHNICAL FIELD

The present disclosure relates to a field of communication technologies, and more particularly, to a hybrid automatic repeat request (HARQ) feedback method, an HARQ feedback apparatus, and a storage medium.

BACKGROUND

With development of the field of wireless communication technologies, users have more and more diverse requirements on the wireless communication, which prompts continuous evolution of the wireless communication technologies towards the fifth generation (5G) mobile communication network.

SUMMARY

The present disclosure provides an HARQ feedback method, an HARQ feedback apparatus, and a storage medium.

According to a first aspect of embodiments of the present disclosure, an HARQ feedback method is provided. The method is performed by a terminal. The method includes: receiving a power saving signal, in which the power saving signal is configured to indicate the terminal to perform a power saving related action; and performing HARQ feedback based on a receipt result of the power saving signal.

According to a second aspect of embodiments of the present disclosure, an HARQ feedback method is provided. The method is performed by a base station. The method includes sending a power saving signal to a terminal, in which the power saving signal is configured to indicate the terminal to perform a power saving related action; and receiving a feedback message sent by the terminal when performing HARQ feedback for the power saving signal.

According to a third aspect of embodiments of the present disclosure, an HARQ feedback apparatus is provided. The apparatus is applicable in a terminal. The apparatus includes a signal receiving module and a feedback module. The signal receiving module is configured to receive a power saving signal, in which the power saving signal is configured to indicate the terminal to perform a power saving related action. The feedback module is configured to perform HARQ feedback based on a receipt result of the power saving signal.

According to a fourth aspect of embodiments of the present disclosure, an HARQ feedback apparatus is provided. The apparatus is applicable in a base station. The apparatus includes a signal sending module and a feedback receiving module. The signal sending module is configured to send a power saving signal to a terminal, in which the power saving signal is configured to indicate the terminal to perform a power saving related action. The feedback receiving module is configured to receive a feedback message sent by the terminal when performing HARQ feedback for the power saving signal.

It is to be understood that both the foregoing general description and the following detailed description are exemplary and explanatory only, and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure as recited in the appended claims.

It should be understood that, in the disclosure, "several" means one or more, and "a plurality of" means two or more. "and/or", describes the relationship of the association objects, indicating that there may exist three relationships, for example, A and/or B, may represent: any of existing A only, existing both A and B, or existing B only. The character "/" generally means the contextual object is a kind of "or" relationship. For ease of understanding, some application scenarios involved in the present disclosure will be described below.

In a related art, under the support of 5G new radio (NR), a terminal may support various businesses, for example, multimedia services, cloud services, interaction services and so on. In order to save power consumption of the terminal, the terminal may determine whether to monitor scheduling data in a physical downlink control channel (PDCCH) based on a power saving signal configured by a base station before processing business data, so as to save power of the terminal.

Figure 1:
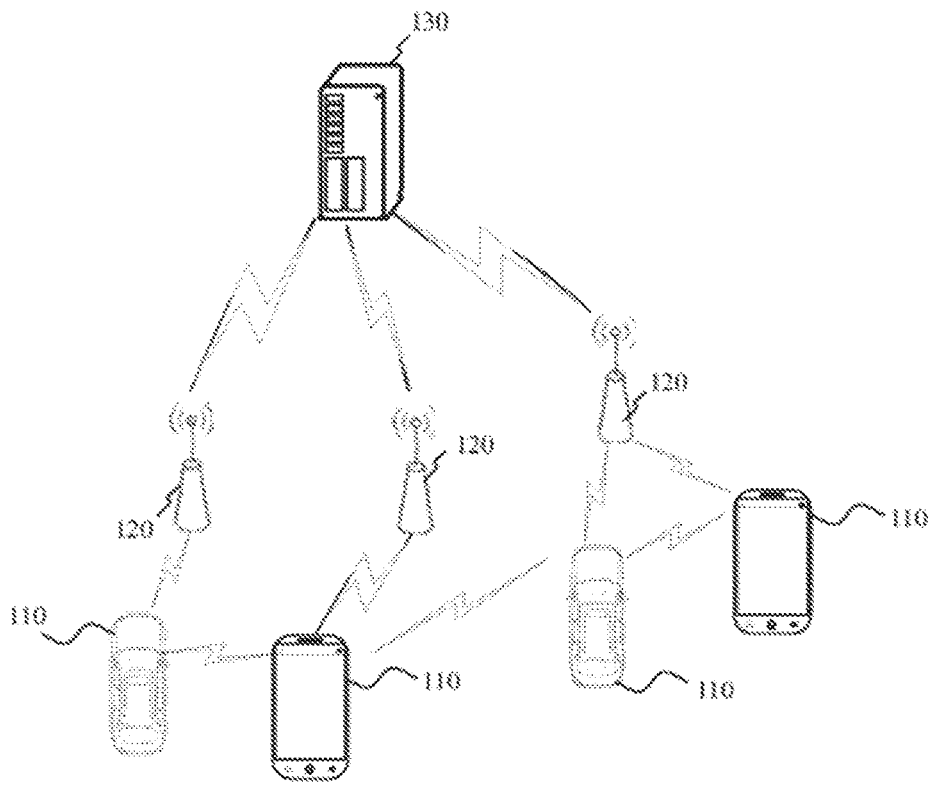
FIG. 1 is a schematic diagram illustrating a wireless communication system according to an embodiment of the present disclosure.

FIG. 1 is a schematic diagram illustrating a wireless communication system according to an embodiment of the present disclosure. As illustrated in FIG. 1, the wireless communication system is a communication system based on a cellular mobile communication technology. The wireless communication system may include several terminals 110 and several base stations 120.

The terminal 110 may refer to a device that provides voice and/or data connectivity for a user. The terminal 110 may communicate with one or more core networks through a radio access network (RAN). The terminal 110 may be an internet of things terminal, for example, a sensor device, a mobile phone (or referred to as a cellular phone) and a computer having an internet of things terminal, for example, may be a fixed, portable, compact, handheld, computer built-in or vehicle-mounted apparatus, for example, a station (STA), a subscriber unit, a subscriber station, a mobile station, a mobile, a remote station, an access point, a remote terminal, an access terminal, a user terminal, a user agent, a user device or a user equipment (UE). Or, the terminal 110 may be a device of an unmanned vehicle, a vehicle-mounted device, etc.

The base station 120 may be a network side device in the wireless communication system. The wireless communication system may be the 4th generation mobile communication (4G) system, also referred to as a long term evolution (LTE) system; or the wireless communication system may be the 5G system, also referred to as a new radio (NR) system. Or, the wireless communication system may be a next generation system of the 5G system.

The base station 120 may be an eNB adopted in the 4G system. Or, the base station 120 may be a base station (gNB) with a centralized distributed architecture in the 5G system. When the base station 120 adopts a centralized distributed architecture, it generally includes a central unit (CU) and at least two distributed units (DU). The central unit is provided with a protocol stack including a Packet Data Convergence Protocol (PDCP) layer, a Radio Link Control (RLC) layer and a Media Access Control (MAC) layer. The distributed unit is provided with a protocol stack including a physical (PHY) layer. The specific implementation of the base station 120 is not limited in embodiments of the disclosure.

A wireless connection can be established between the base station 120 and the terminal 110 through a wireless air interface. In different embodiments, the wireless air interface is a wireless air interface based on the 4G standard. Alternatively, the wireless air interface is a wireless air interface based on the 5G standard. For example, the wireless air interface is the NR. Alternatively, the wireless air interface can also be a wireless air interface based on a standard of next generation mobile communication network technology based on the 5G.

Alternatively, the wireless communication system may further include a network management device 130.

Server base stations 120 are connected to the network management device 130 respectively. The network management device 130 may be a core network device in the wireless communication system. For example, the network management device 130 may be a mobility management entity (MME) of an evolved packet core (EPC) network. Alternatively, the network management device may also be another core network device, such as a serving gateway (SGW), a public data network gateway (PGW), and a policy and charging rules function (PCRF) unit or a home subscriber server (HSS). The implementation form of the network management device 130 is not limited in the embodiments of the disclosure.

In a possible implementation, in the above wireless communication system, when scheduling data is transmitted in a physical downlink control channel (PDCCH), the terminal 110 needs to detect the PDCCH to receive the scheduling data transmitted in the PDCCH. For example, when the terminal monitors the PDCCH, if first scheduling data sent from a base station is transmitted in the PDCCH, the terminal may receive the first scheduling data sent from the base station. In the NR system, the terminal needs not to monitor PDCCH all the time before the scheduling data transmitted in the PDCCH, but monitors the PDCCH at some specific time. Alternatively, in embodiments of the present disclosure, the specific time may be referred to as active time.

In a possible implementation, the active time may be on duration time in the discontinuous reception (DRX), or may be monitoring occasions in PDCCH configured by the base station. That is, when the active time arrives, the terminal may be awakened to monitor the scheduling data transmitted in the PDCCH. In this case, when the terminal has no business in the incoming active time, if the terminal starts to monitor the PDCCH in the active time, the power of the terminal may be wasted, thus causing unnecessary power loss.

In order to avoid occurrence of the above situation, in a technical solution provided by the present disclosure, a power saving signal may be introduced before the active time arrives to remind the terminal to be awakened in the active time to monitor the PDCCH or to keep sleep without being awakened in the active time, so as to further save the power consumption of the terminal. In other words, the power saving single may indicate whether the terminal monitors the PDCCH in the active time. Alternatively, when the power saving signal received by the terminal indicates that the terminal does not monitor the scheduling data transmitted in the PDCCH in the current active time, the terminal may wait for a next power saving signal, such that a waste of power of the terminal caused by monitoring the PDCCH in a time period during which no scheduling data is transmitted can be avoided.

Further, in the NR system, when the terminal is awakened to perform business interaction, a frequency for PDCCH monitoring, a bandwidth to be monitored by the terminal, a number of receiving antennas or transmitting antennas and other information can be configured flexibly. For example, when there are intensive businesses and a large amount of data, a big bandwidth, more antennas and more frequently PDCCH monitoring activities can be configured for the terminal. In this case, these configures may consume a lot of power of the terminal. On the contrary, when there are sparse businesses, the base station may adjust the configures, for example, causing the terminal to monitor a small bandwidth with less receiving antennas, and/or configuring less frequently PDCCH monitoring activities. In this case, the power saving signal may be used to switch these configures or to reconfigure.

When the base station sends the power saving signal to the terminal unilaterally, there may be a situation that the power saving signal is sent incorrectly, in this case, the terminal cannot receive the power saving signal successfully while the base station does not know the receipt situation of the terminal, such that the terminal and the base station may have inconsistent understanding on subsequent operations, thus leading to failure of the subsequent communication.

In order to solve the above problem, the technical solution of the present disclosure further provides a solution of performing HARQ feedback for the power saving signal, in which a sending process of the power saving signal is simplified, such that the base station ma know the receipt situation of the terminal, thus avoiding the situation that the terminal and the base station have inconsistent understanding on the subsequent operations.

Figure 2:
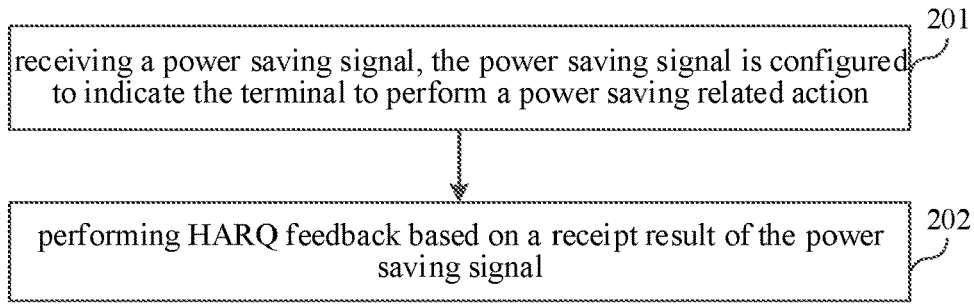
FIG. 2 is a flowchart of an HARQ feedback method according to an embodiment.

FIG. 2 is a flowchart of an HARQ feedback method according to an embodiment. The method may be applied to the wireless communication system shown in FIG. 1, and performed by a terminal in the wireless communication system. As illustrated in FIG. 2, the method may include the following.

In 201, a power saving signal is received. The power saving signal is configured to indicate the terminal to perform a power saving related action.

In 202, HARQ feedback is performed based on a receipt result of the power saving signal.

Alternatively, performing the HARQ feedback based on the receipt result of the power saving signal includes sending an acknowledge (ACK) feedback message to a base station in response to successfully receiving the power saving signal, and sending a non-acknowledge (NACK) feedback message to the base station in response to failing to receive the power saving signal; or sending an acknowledge (ACK) feedback message to a base station in response to successfully receiving the power saving signal, and feeding back nothing to the base station in response to failing to receive the power saving signal; or feeding back nothing to a base station in response to successfully receiving the power saving signal, and sending a non-acknowledge (NACK) feedback message to the base station in response to failing to receive the power saving signal.

Alternatively, performing the HARQ feedback based on the receipt result of the power saving signal includes acquiring a physical uplink control channel (PUCCH) resource for performing the HARQ feedback for the power saving signal in response to determining to send a feedback message to a base station based on the receipt result of the power saving signal; acquiring a transmitting time point of the feedback message; acquiring, based on the PUCCH resource and the transmitting time point, an HARQ feedback resource used to perform the HARQ feedback for the power saving signal; and sending the feedback message to the base station on the HARQ feedback resource.

Alternatively, acquiring the PUCCH resource for performing the HARQ feedback for the power saving signal includes acquiring a set of PUCCH resources, in which the set of PUCCH resources is a set containing PUCCH resources available to the terminal and configured through a higher layer signaling; and acquiring the PUCCH resource for performing the HARQ feedback for the power saving signal from the set of PUCCH resources based on a PUCCH resource indicator carried in the power saving signal and/or physical resource location information of the power saving signal.

Alternatively, acquiring the PUCCH resource for performing the HARQ feedback for the power saving signal includes acquiring the PUCCH resource for performing the HARQ feedback for the power saving signal configured for the terminal through a higher layer signaling.

Alternatively, acquiring the transmitting time point of the feedback message includes acquiring a reference time point, in which the reference time point is an end time point of transmission of the power saving signal; and determining a time point after the reference time point and having a specified interval with the reference time point as the transmitting time point.

Alternatively, the specified interval is a preset time period; or the specified interval is a time period configured through a higher layer signaling; or the specified interval is a time period carried in the power saving signal.

Alternatively, the power saving related action includes detecting and receiving a physical downlink control channel (PDCCH) for data scheduling; or skipping detection and receipt of a PDCCH for data scheduling; or adjusting a communication related parameter, in which the communication related parameter includes at least one of a bandwidth value used by the terminal, a number of antennas used by the terminal, a number of candidate locations of PDCCH.

Alternatively, performing the HARQ feedback based on the receipt result of the power saving signal includes performing the HARQ feedback based on the receipt result of the power saving signal in a case that the power saving related action is a specified action.

Alternatively, the specified action is an action preconfigured in the terminal or an action configured by a base station.

In conclusion, the terminal may perform HARQ feedback based on a receipt result of a power saving signal after receiving the power saving signal, so that the base station may timely know whether the terminal successfully receives the power saving signal or not. It is ensured that the terminal and the base station have the same understanding on subsequent power saving operations, thus improving a successful rate of commination performed between the terminal and the base station based on the power saving operations subsequently.

Figure 3:
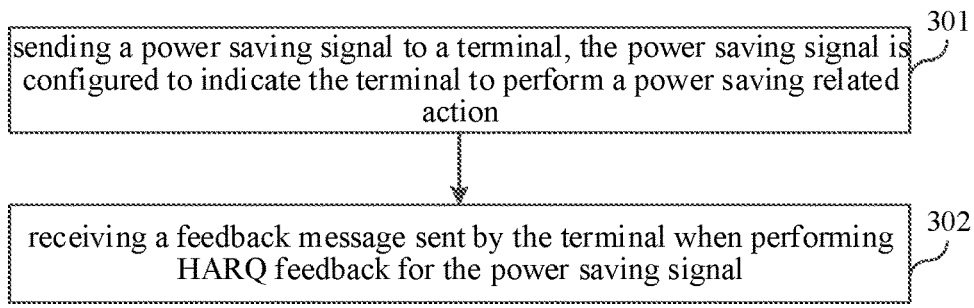
FIG. 3 is a flowchart of an HARQ feedback method according to an embodiment.

FIG. 3 is a flowchart of an HARQ feedback method according to an embodiment. As illustrated in FIG. 3, the method may be applied to the wireless communication system shown in FIG. 1, and performed by a base station. The method may include the following.

In 301, a power saving signal is sent. The power saving signal is configured to indicate the terminal to perform a power saving related action.

In 302, a feedback message sent by the terminal when performing HARQ feedback for the power saving signal is received.

Alternatively, an HARQ feedback resource used by the terminal to send the feedback message is a resource acquired based on a physical uplink control channel (PUCCH) resource used by the terminal to perform the HARQ feedback for the power saving signal and a transmitting time point of the feedback message.

Alternatively, before sending the power saving signal to the terminal, the method further includes configuring a set of PUCCH resources for the terminal through a higher layer signaling, in which the set of PUCCH resources is a set containing PUCCH resources available to the terminal.

Alternatively, before sending the power saving signal to the terminal, the method further includes configuring by a higher layer signaling a PUCCH resource for the terminal for performing the HARQ feedback for the power saving signal.

Alternatively, the transmitting time point is a time point after a reference time point and having a specified interval with the reference time point; in which the reference time point is an end time point of transmission of the power saving signal.

Alternatively, the specified interval is a preset time period; or the specified interval is a time period configured for the terminal through a higher layer signaling; or the specified interval is a time period carried in the power saving signal.

Alternatively, the power saving related action includes detecting and receiving a physical downlink control channel (PDCCH) for data scheduling; or skipping detection and receipt of a PDCCH for data scheduling; or adjusting a communication related parameter, in which the communication related parameter includes at least one of a bandwidth value used by the terminal, a number of antennas used by the terminal, a number of candidate locations of PDCCH.

Alternatively, receiving the feedback message sent by the terminal when performing HARQ feedback for the power saving signal includes receiving the feedback message sent by the terminal in a case that the power saving related action is a specified action.

Alternatively, the specified action is an action preconfigured in the terminal or an action configured by the base station for the terminal.

Alternatively, the method further includes performing a scheduling operation or a transmission adjustment operation corresponding to the power saving related action in a case that the feedback message indicates that the terminal successfully receives the power saving signal.

In conclusion, after sending the power saving signal to the terminal, the base station may receive the feedback information sent by the terminal when performing the HARQ feedback for the power saving signal, such that the base station may timely know whether the terminal successfully receives the power saving signal or not. It is ensured that the terminal and the base station have the same understanding on subsequent power saving operations, thus improving a successful rate of performed between the terminal and the base station based on the power saving operations subsequently.

Figure 4:
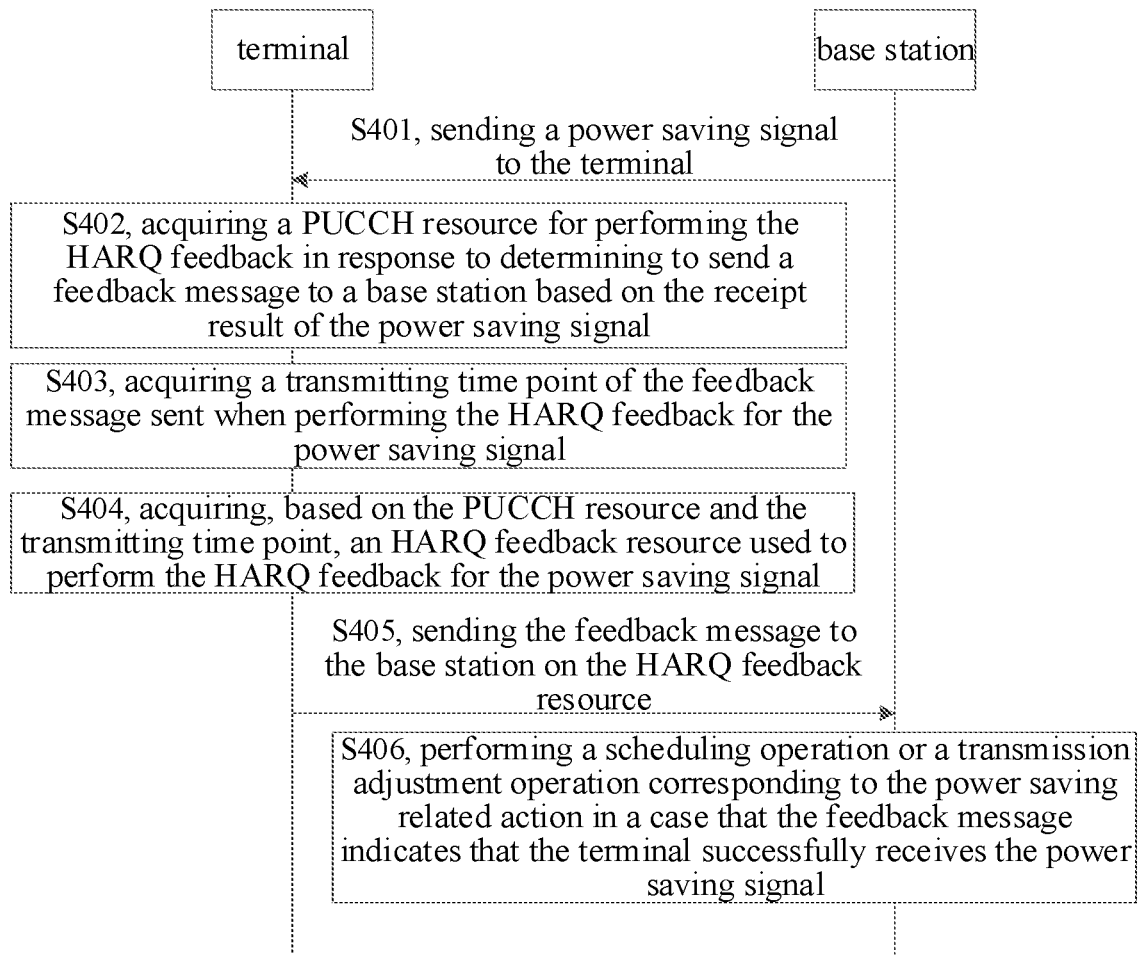
FIG. 4 is a flowchart of an HARQ feedback method according to an embodiment.

FIG. 4 is a flowchart of an HARQ feedback method according to an embodiment. As illustrated in FIG. 4, if at least two terminals correspond to a power saving signal sent by a base station include a target terminal, the method may be applied to the wireless communication system shown in FIG. 1, and performed by the base station and the terminal in the wireless communication system. Alternatively, the terminal may be the target terminal, and the method may include the following.

In 401, the base station sends a power saving signal to the terminal. Correspondingly, the terminal receives the power saving signal.

The power saving signal is configured to indicate the terminal to perform a power saving related action.

In a possible implementation, the power saving related action may include the following.
  1) detecting and receiving a physical downlink control channel (PDCCH) for data scheduling For example, when the base station needs to perform data scheduling for the terminal within a subsequent time period, for example, transmission of business data needs to be performed between the base station and terminal subsequently, the base station may send the power saving signal to the terminal to indicate the terminal to be awakened in the corresponding active time to detect and receive the PDCCH.
  2) skipping detection and receipt of a PDCCH for data scheduling For example, when the base station needs not to perform data scheduling for the terminal within a subsequent time period, for example, no transmission of business data needs to be performed between the base station and terminal subsequently, the base station may send the power saving signal to the terminal to indicate the terminal to keep sleep in the corresponding active time to save electric quantity of the terminal.
  3) adjusting a communication related parameter, and the communication related parameter includes at least one of a bandwidth value used by the terminal, a number of antennas used by the terminal, a number of candidate locations of PDCCH For example, when the amount of data needs to be transmitted between the base station and the terminal within a subsequent time period is increased, the base station may send the power saving signal to the terminal to indicate the terminal to use higher bandwidth, more antennas and to monitor more PDDCH candidate locations, so as to adapt to transmission of subsequent business data.

For another example, when the amount of data needs to be transmitted between the base station and the terminal within a subsequent time period is decreased, the base station may send the power saving signal to the terminal to indicate the terminal to use lower bandwidth, less antennas and to monitor less PDDCH candidate locations, so as to save electric quantity of the terminal.

In 402, the terminal acquires a physical uplink control channel (PUCCH) resource for performing HARQ feedback for the power saving signal in response to determining to send a feedback message to the base station based on a receipt result of the power saving signal.

The terminal may perform the HARQ feedback for the power saving signal in any of the following manners.
  1) sending an acknowledge (ACK) feedback message to a base station in response to successfully receiving the power saving signal, and sending a non-acknowledge (NACK) feedback message to the base station in response to failing to receive the power saving signal In a possible implementation, the terminal may send the feedback message to the base station with regard to the power saving signal regardless of whether the terminal receives the power saving signal successfully.

For example, the terminal determines to send the ACK message to the base station in response to successfully receiving the power saving signal. Otherwise, the terminal determines to send the NACK message to the base station in response to failing to receive the power saving signal.

Alternatively, the terminal may determine to send the NACK message to the base station in response to successfully receiving the power saving signal, and determine to send the ACK message to the base station in response to failing to receive the power saving signal.
  2) sending the ACK feedback message to a base station in response to successfully receiving the power saving signal, and feeding back nothing to the base station in response to failing to receive the power saving signal In a possible implementation, the terminal may send the feedback message to the base station with regard to the power saving signal merely when the terminal receives the power saving signal successfully.

For example, the terminal determines to send the ACK message to the base station in response to successfully receiving the power saving signal.

Alternatively, the terminal may determine to send the NACK message to the base station in response to successfully receiving the power saving signal.
  3) feeding back nothing to a base station in response to successfully receiving the power saving signal, and sending the NACK feedback message to the base station in response to failing to receive the power saving signal In a possible implementation, the terminal may send the feedback message to the base station with regard to the power saving signal merely when the terminal fails to receiving the power saving signal.

For example, the terminal determines to send the NACK message to the base station in response to failing to receiving the power saving signal.

Alternatively, the terminal may determine to send the ACK message to the base station in response to failing to receiving the power saving signal.

In a possible implementation, when acquiring the PUCCH resource for performing the HARQ feedback for the power saving signal, the terminal may acquire a set of PUCCH resources, which may be a set containing PUCCH resources available to the terminal configured through a higher layer signaling, and acquire the PUCCH resource for performing the HARQ feedback for the power saving signal from the set of PUCCH resources based on a PUCCH resource indicator carried in the power saving signal and/or physical resource location information of the power saving signal.

Correspondingly, in such possible implementation, before sending the power saving signal to the terminal, the base station configures the set of PUCCH resources for the terminal through the higher layer signaling.

For example, the base station may configure a set of PUCCH resources in advance through the higher layer signaling. Each PUCCH resource in the set has a corresponding number, such as {N_PUCCH1, N_PUCCH2, N_PUCCH3 . . . }. When the number of PUCCH resources in the set is less than or equal to 8, the PUCCH resource number may be directly indicated by an information field of 3 bit in the power saving signal. When the number of PUCCH resources in the set is greater than 8, the PUCCH resource number may be derived from indication information of the information field of 3 bit in the power saving signal and the minimum control channel element (CCE) number corresponding to the PDCCH. A formula for the derivative process may be expressed as follows.

$$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases}$$

where $R_{PUUCH}$ represents a size of the set of PUCCH resources. $N_{CCE,p}$ represents the total number of CCEs occupied by a control field where the PDCCH is located. $n_{CCE,p}$ represents the minimum CCE number corresponding to the PDCCH. $\Delta_{PRI}$ represents a value indicated by the information field of 3 bit in the power saving signal.

The value indicated by the information field of 3 bit in the power saving signal is the PUCCH resource indicator, and the minimum CCE number corresponding to PDCCH is the physical resource location information of the power saving signal.

Alternatively, besides of carrying the PUCCH resource indicator in the power saving signal, the base station may also send the PUCCH resource indicator to the terminal through downlink control information (DCI).

Alternatively, for a given set of PUCCH resources, the terminal may derive the PUCCH resource for performing the HARQ feedback for the power saving signal from the minimum CCE number corresponding to the PDCCH.

In another possible implementation, when acquiring the PUCCH resource for performing the HARQ feedback for the power saving signal, the terminal may acquire the PUCCH resource for performing the HARQ feedback for the power saving signal that is configured for the terminal through a higher layer signaling.

Correspondingly, in such possible implementation, before sending the power saving signal to the terminal, the base station may also configure by the higher layer signaling the PUCCH resource for the terminal for performing the HARQ feedback for the power saving signal.

For example, the base station may configure a fixed PUCCH resource for the terminal through the higher layer signaling. When the terminal determines to perform feedback for the power saving signal, the terminal may directly acquires the PUCCH resource.

In 403, the terminal acquires a transmitting time point of the feedback message sent when performing the HARQ feedback for the power saving signal.

In a possible implementation, when acquiring the transmitting time point of the feedback message, the terminal may acquire a reference time point which is an end time point of transmission of the power saving signal, and determine a time point after the reference time point and having a specified interval with the reference time point as the transmitting time point.

Alternatively, the specified interval is a preset time period.

Alternatively, the specified interval is a time period configured through a higher layer signaling.

Alternatively, the specified interval is a time period carried in the power saving signal.

For example, the terminal may determine the end time point of transmission of the power saving signal as the reference time point and perform the HARQ feedback for the power saving signal after a fixed time period, in which the fixed time period may be a time period preconfigured in the terminal (for example, the time period may be provided in the protocol), or the fixed time period may be a time period configured by the base station in advance through the higher layer signaling.

Alternatively, the terminal may determine the end time point of transmission of the power saving signal as the reference time point and perform the HARQ feedback for the power saving signal after a fixed time period, in which the fixed time period may be a time period specifically configured for the power saving signal, for example, the time period may be carried in the power saving signal.

In 404, the terminal determines an HARQ feedback resource used to perform the HARQ feedback for the power saving signal, based on the PUCCH resource for performing the HARQ feedback for the power saving signal and the transmitting time point.

After acquiring the PUCCH resource for performing the HARQ feedback and the transmitting time point of the feedback message, the terminal may determine the HARQ feedback resource used to send the feedback message.

Correspondingly, the base station may also acquire the HARQ feedback resource that may be used by the terminal to send the HARQ feedback message in a similar manner, to facilitate receiving the feedback message from the terminal with regard to the power saving signal subsequently.

In 405, the terminal sends the feedback message to the base station on the HARQ feedback resource. Correspondingly, the base station may receive the feedback message on the HARQ feedback resource.

Alternatively, when performing the HARQ feedback based on the receipt result of the power saving signal, the terminal may perform the HARQ feedback based on the receipt result of the power saving signal in a case that the power saving related action is a specified action.

The specified action may be an action preconfigured in the terminal. Alternatively, the specified action may be an action configured by the base station.

In a possible implementation, the specified action corresponding to the power saving signal for which the HARQ feedback needs to be performed may be preset in the terminal. For example, in the communication standard protocol, it may be stipulated mandatorily the feedback needs to be performed for the receipt situations of the power saving signals corresponding to some certain power saving related actions. In other words, provisions about some kind of power saving signals may be made in the communication standard protocol. For example, it is stipulated that when the power saving signal is configured to awaken the terminal to monitor the PDCCH or the power saving signal is configured to change a related parameter, the terminal needs to perform the HARQ feedback for the power saving signal, and when the power saving signal is configured to indicate the terminal to keep sleep to skip monitoring and receiving of the PDCCH, the terminal needs not perform the HARQ feedback for the power saving signal.

In another possible implementation, the base station may configure whether to perform the feedback. For example, the base station may configure the specified action corresponding to the power saving signal for which the HARQ feedback needs to be performed for the terminal through a radio resource control (RRC) signaling. When the base station configures, the base station may configure for the power saving signals having different functions jointly. For example, the base station may configure that the feedback needs to be performed or no feedback needs to be performed for each of the power saving signals having different functions. Alternatively, the base station may configure for the power saving signals having different functions separately. For example, the base station may configure that when the power saving signal is configured to awaken the terminal to monitor the PDCCH or the power saving signal is configured to change a related parameter, the terminal needs to perform the HARQ feedback for the power saving signal. Also, the base station may configure that when the power saving signal is configured to indicate the terminal to keep sleep to skip monitoring and receiving of the PDCCH, the terminal needs not to perform the HARQ feedback for the power saving signal.

In 406, in a case that the feedback message indicates that the terminal successfully receives the power saving signal, the base station performs a scheduling operation or a transmission adjustment operation corresponding to the power saving related action.

In the embodiment of the present disclosure, the base station needs to perform the corresponding scheduling or adjustment after the terminal performs the feedback for the power saving signal. For example, when the terminal performs the feedback for the power saving signal configured to awaken the terminal to monitor the PDCCH, the base station may perform the corresponding scheduling after determining that the terminal has received the power saving signal successfully based on the feedback message. If the feedback message indicates that the terminal does not successfully receives the power saving signal, the base station does not perform the corresponding scheduling. For another example, when the terminal performs the feedback for the power saving signal configured to adjust a related parameter, if the base station determines that the terminal has received the power saving signal successfully based on the feedback message, the base station may perform data transmission bases on newly configured parameter, or else, the base station performs the scheduling on the data transmission in an original way.

In conclusion, the terminal may perform the HARQ feedback based on the receipt result of the power saving signal after receiving the power saving signal. Correspondingly, after the base station receives the feedback message from the terminal and determines that the terminal receives the power saving signal, the base station may perform the corresponding scheduling or adjustment, so that the base station may timely know whether the terminal successfully receives the power saving signal or not. It is ensured that the terminal and the base station have the same understanding on subsequent power saving operations, thus improving a successful rate of commination performed between the terminal and the base station based on the power saving operations subsequently.

Apparatus embodiments of the present disclosure will be described below, which may be used to implement the method embodiments of the present disclosure. Regarding details not described in the apparatus embodiments, reference can be made to the method embodiments.

Figure 5:
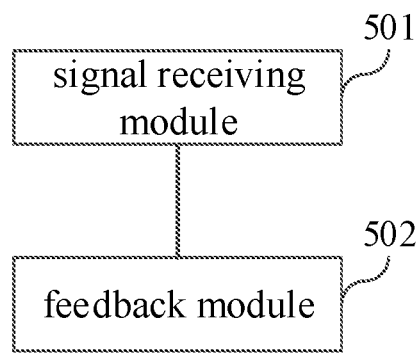
FIG. 5 is a block diagram of an HARQ feedback apparatus according to an embodiment.

FIG. 5 is a block diagram of an HARQ feedback apparatus according to an embodiment. As illustrated in FIG. 5, the apparatus may be implemented as a part or all of a terminal in the implementation environment shown in FIG. 1 through hardware or a combination of software and hardware, so as to perform operations executed by the terminal in any of embodiments described with reference to FIG. 2, FIG. 3 and FIG. 4. The apparatus may include a signal receiving module 501 and a feedback module 502.

The signal receiving module 501 is configured to receive a power saving signal, in which the power saving signal is configured to indicate the terminal to perform a power saving related action.

The feedback module 502 is configured to perform HARQ feedback based on a receipt result of the power saving signal.

Alternatively, the feedback module 502 is configured to: send an acknowledge (ACK) feedback message to a base station in response to successfully receiving the power saving signal, and send a non-acknowledge (NACK) feedback message to the base station in response to failing to receive the power saving signal; or send an acknowledge (ACK) feedback message to a base station in response to successfully receiving the power saving signal, and feedback nothing to the base station in response to failing to receive the power saving signal; or feedback nothing to a base station in response to successfully receiving the power saving signal, and send a non-acknowledge (NACK) feedback message to the base station in response to failing to receive the power saving signal.

Alternatively, the feedback module 502 is configured to acquire a physical uplink control channel (PUCCH) resource for performing the HARQ feedback for the power saving signal in response to determining to send a feedback message to a base station based on the receipt result of the power saving signal; acquire a transmitting time point of the feedback message; acquire, based on the PUCCH resource and the transmitting time point, an HARQ feedback resource used to perform the HARQ feedback for the power saving signal; and send the feedback message to the base station on the HARQ feedback resource.

Alternatively, when acquiring the PUCCH resource for performing the HARQ feedback for the power saving signal, the feedback module 502 is configured to acquire a set of PUCCH resources, in which the set of PUCCH resources is a set containing PUCCH resources available to the terminal and configured through a higher layer signaling; and acquire the PUCCH resource for performing the HARQ feedback for the power saving signal from the set of PUCCH resources based on a PUCCH resource indicator carried in the power saving signal and/or physical resource location information of the power saving signal.

Alternatively, when acquiring the PUCCH resource for performing the HARQ feedback for the power saving signal, the feedback module 502 is configured to acquire the PUCCH resource for performing the HARQ feedback for the power saving signal configured for the terminal through a higher layer signaling.

Alternatively, when acquiring the transmitting time point of the feedback message, the feedback module 502 is configured to acquire a reference time point, in which the reference time point is an end time point of transmission of the power saving signal; and determine a time point after the reference time point and having a specified interval with the reference time point as the transmitting time point.

Alternatively, the specified interval is a preset time period; or the specified interval is a time period configured through a higher layer signaling; or the specified interval is a time period carried in the power saving signal.

Alternatively, the power saving related action includes detecting and receiving a physical downlink control channel (PDCCH) for data scheduling; or skipping detection and receipt of a PDCCH for data scheduling; or adjusting a communication related parameter, in which the communication related parameter includes at least one of a bandwidth value used by the terminal, a number of antennas used by the terminal, a number of candidate locations of PDCCH.

Alternatively, the feedback module is configured to perform the HARQ feedback based on the receipt result of the power saving signal in a case that the power saving related action is a specified action.

Alternatively, the specified action is an action preconfigured in the terminal or an action configured by a base station.

Figure 6:
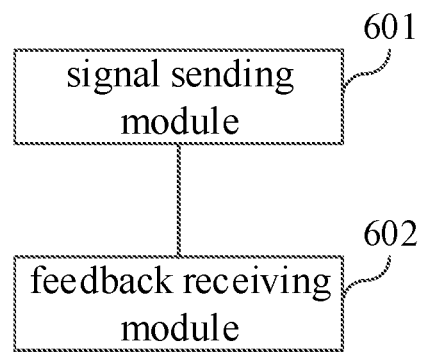
FIG. 6 is a block diagram of an HARQ feedback apparatus according to an embodiment.

FIG. 6 is a block diagram of an HARQ feedback apparatus according to an embodiment. As illustrated in FIG. 6, the apparatus may be implemented as a part or all of a terminal in the implementation environment shown in FIG. 1 through hardware or a combination of software and hardware, so as to perform operations executed by the base station in any of embodiments described with reference to FIG. 2, FIG. 3 and FIG. 4. The apparatus may include a signal sending module 601 and a feedback receiving module 602.

The signal sending module 601 is configured to send a power saving signal to a terminal, in which the power saving signal is configured to indicate the terminal to perform a power saving related action.

The feedback receiving module 602 is configured to receive a feedback message sent by the terminal when performing HARQ feedback for the power saving signal.

Alternatively, an HARQ feedback resource used by the terminal to send the feedback message is a resource acquired based on a physical uplink control channel (PUCCH) resource used by the terminal to perform the HARQ feedback for the power saving signal and a transmitting time point of the feedback message.

Alternatively, the apparatus further includes a resources set configuring module, configured to configure a set of PUCCH resources for the terminal through a higher layer signaling before the signal sending module 601 sends the power saving signal to the terminal, in which the set of PUCCH resources is a set containing PUCCH resources available to the terminal.

Alternatively, the apparatus further includes a resources configuring module, configured to configure by a higher layer signaling a PUCCH resource for the terminal for performing the HARQ feedback for the power saving signal before the signal sending module 601 sends the power saving signal to the terminal.

Alternatively, the transmitting time point is a time point after a reference time point and having a specified interval with the reference time point; in which the reference time point is an end time point of transmission of the power saving signal.

Alternatively, the specified interval is a preset time period; or the specified interval is a time period configured for the terminal through a higher layer signaling; or the specified interval is a time period carried in the power saving signal.

Alternatively, the power saving related action includes detecting and receiving a physical downlink control channel (PDCCH) for data scheduling; or skipping detection and receipt of a PDCCH for data scheduling; or adjusting a communication related parameter, in which the communication related parameter comprises at least one of a bandwidth value used by the terminal, a number of antennas used by the terminal, a number of candidate locations of PDCCH.

Alternatively, the feedback receiving module is configured to receive the feedback message sent by the terminal in a case that the power saving related action is a specified action.

Alternatively, the specified action is an action preconfigured in the terminal or an action configured by a base station.

Alternatively, the apparatus further includes a schedule adjusting module, configured to perform a scheduling operation or a transmission adjustment operation corresponding to the power saving related action in a case that the feedback message indicates that the terminal successfully receives the power saving signal.

It should be noted that, the division of functional modules for implementing the functionalities in the apparatus provided in the above embodiments is only for illustration. In practical applications, the above functionalities may be completed by different functional modules according to actual requirements, that is, the device can be divided into different functional modules to complete all or part of functionalities described above.

Regarding the apparatus in the above embodiments, the specific manner in which each module performs operation has been described in detail in the method embodiments, and detailed description are not given here.

An embodiment of the present disclosure further discloses an HARQ feedback apparatus, which may perform some or all of operations executed by the terminal in any of embodiments described with reference to FIG. 2, FIG. 3 and FIG. 4. The apparatus may include a processor and a memory configured to store instructions executable by the processor.

The processor is configured to: receive a power saving signal, in which the power saving signal is configured to indicate the terminal to perform a power saving related action; and perform HARQ feedback based on a receipt result of the power saving signal.

Alternatively, performing the HARQ feedback based on the receipt result of the power saving signal includes sending an acknowledge (ACK) feedback message to a base station in response to successfully receiving the power saving signal, and sending a non-acknowledge (NACK) feedback message to the base station in response to failing to receive the power saving signal; or sending an acknowledge (ACK) feedback message to a base station in response to successfully receiving the power saving signal, and feeding back nothing to the base station in response to failing to receive the power saving signal; or feeding back nothing to a base station in response to successfully receiving the power saving signal, and sending a non-acknowledge (NACK) feedback message to the base station in response to failing to receive the power saving signal.

Alternatively, performing the HARQ feedback based on the receipt result of the power saving signal includes acquiring a physical uplink control channel (PUCCH) resource for performing the HARQ feedback for the power saving signal in response to determining to send a feedback message to a base station based on the receipt result of the power saving signal; acquiring a transmitting time point of the feedback message; acquiring, based on the PUCCH resource and the transmitting time point, an HARQ feedback resource used to perform the HARQ feedback for the power saving signal; and sending the feedback message to the base station on the HARQ feedback resource.

Alternatively, acquiring the PUCCH resource for performing the HARQ feedback for the power saving signal includes acquiring a set of PUCCH resources, in which the set of PUCCH resources is a set containing PUCCH resources available to the terminal and configured through a higher layer signaling; and acquiring the PUCCH resource for performing the HARQ feedback for the power saving signal from the set of PUCCH resources based on a PUCCH resource indicator carried in the power saving signal and/or physical resource location information of the power saving signal.

Alternatively, acquiring the PUCCH resource for performing the HARQ feedback for the power saving signal includes acquiring the PUCCH resource for performing the HARQ feedback for the power saving signal configured for the terminal through a higher layer signaling.

Alternatively, acquiring the transmitting time point of the feedback message includes acquiring a reference time point, in which the reference time point is an end time point of transmission of the power saving signal; and determining a time point after the reference time point and having a specified interval with the reference time point as the transmitting time point.

Alternatively, the specified interval is a preset time period; or the specified interval is a time period configured through a higher layer signaling; or the specified interval is a time period carried in the power saving signal.

Alternatively, the power saving related action includes detecting and receiving a physical downlink control channel (PDCCH) for data scheduling; or skipping detection and receipt of a PDCCH for data scheduling; or adjusting a communication related parameter, in which the communication related parameter includes at least one of a bandwidth value used by the terminal, a number of antennas used by the terminal, a number of candidate locations of PDCCH.

Alternatively, performing the HARQ feedback based on the receipt result of the power saving signal includes performing the HARQ feedback based on the receipt result of the power saving signal in a case that the power saving related action is a specified action.

Alternatively, the specified action is an action preconfigured in the terminal or an action configured by a base station.

An embodiment of the present disclosure further discloses an HARQ feedback apparatus, which may perform some or all of operations executed by the base station in any of embodiments described with reference to FIG. 2 to FIG. 4. The apparatus may include a processor and a memory configured to store instructions executable by the processor.

The processor is configured to: send a power saving signal, in which the power saving signal is configured to indicate the terminal to perform a power saving related action; and receive a feedback message sent by the terminal when performing HARQ feedback for the power saving signal.

Alternatively, an HARQ feedback resource used by the terminal to send the feedback message is a resource acquired based on a physical uplink control channel (PUCCH) resource used by the terminal to perform the HARQ feedback for the power saving signal and a transmitting time point of the feedback message.

Alternatively, the processor is further configured to configure a set of PUCCH resources for the terminal through a higher layer signaling before sending the power saving signal to the terminal, in which the set of PUCCH resources is a set containing PUCCH resources available to the terminal.

Alternatively, the processor is further configured to configure by a higher layer signaling a PUCCH resource for the terminal for performing the HARQ feedback for the power saving signal before sending the power saving signal to the terminal.

Alternatively, the transmitting time point is a time point after a reference time point and having a specified interval with the reference time point; in which the reference time point is an end time point of transmission of the power saving signal.

Alternatively, the specified interval is a preset time period; or the specified interval is a time period configured for the terminal through a higher layer signaling; or the specified interval is a time period carried in the power saving signal.

Alternatively, the power saving related action includes detecting and receiving a physical downlink control channel (PDCCH) for data scheduling; or skipping detection and receipt of a PDCCH for data scheduling; or adjusting a communication related parameter, in which the communication related parameter includes at least one of a bandwidth value used by the terminal, a number of antennas used by the terminal, a number of candidate locations of PDCCH.

Alternatively, receiving the feedback message sent by the terminal when performing HARQ feedback for the power saving signal includes receiving the feedback message sent by the terminal in a case that the power saving related action is a specified action.

Alternatively, the specified action is an action preconfigured in the terminal or an action configured by the base station for the terminal.

Alternatively, the processor is further configured to perform a scheduling operation or a transmission adjustment operation corresponding to the power saving related action in a case that the feedback message indicates that the terminal successfully receives the power saving signal.

The solutions according to the embodiments of the present disclosure are described mainly taking the base station and the terminal as example. It should be understood that the terminal and the base station include respective hardware structures and/or software modules for performing the above functions. In combination with the modules and algorithm steps of the examples described in the embodiments disclosed in this specification, the embodiments of the present disclosure may be implemented by hardware, or a combination of hardware and computer software. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Figure 7:
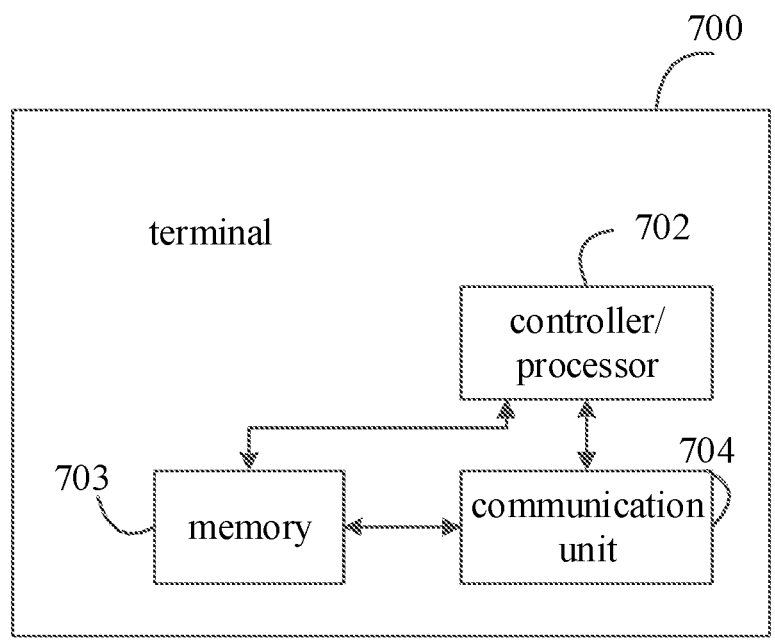
FIG. 7 is a block diagram of a terminal according to an embodiment.

FIG. 7 is a block diagram of a terminal according to an embodiment.

The terminal 700 includes a communication unit 704 and a processor 702. The processor 702 may be a controller, and is denoted as "controller/processor 702" in FIG. 7. The communication unit 704 is configured to support communication between the terminal and other network devices (for example, terminals, other base stations, gateways, etc.)

Further, the terminal 700 further includes a memory 703 configured to store program codes and data of the terminal 700.

It should be understood that, FIG. 7 only illustrates a simplified design of the terminal 700. In practical applications, the terminal 700 may include any number of processors, controllers, memories, communication units, etc., and all access network devices that may be implemented in embodiments of the present disclosure are within the protection scope of embodiments of the present disclosure.

Figure 8:
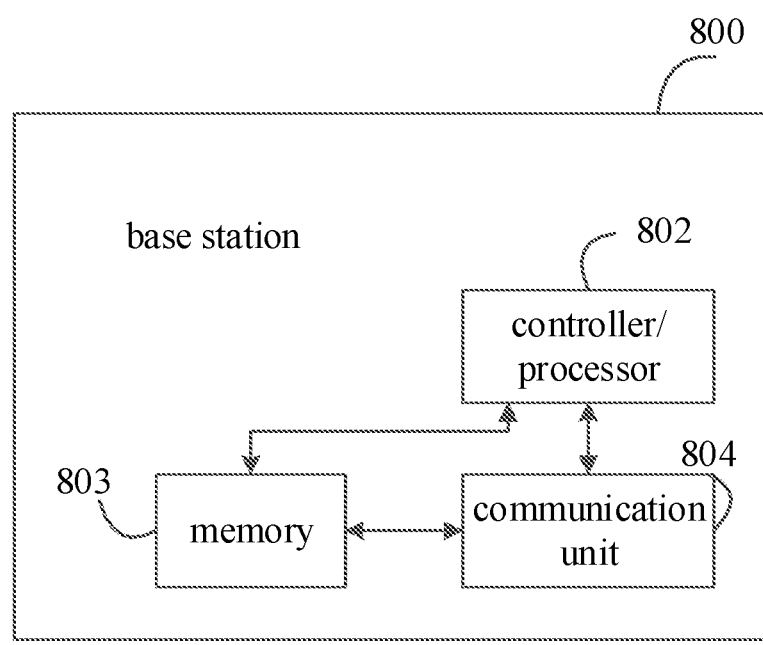
FIG. 8 is a block diagram of a base station according to an embodiment.

FIG. 8 is a block diagram of a base station according to an embodiment.

The base station 800 includes a communication unit 804 and a processor 802. The processor 802 may be a controller, and is denoted as "controller/processor 802" in FIG. 8. The communication unit 804 is configured to support communication between the base station and other network devices (for example, terminals, other base stations, gateways, etc.)

Further, the base station 800 further includes a memory 803 configured to store program codes and data of the base station 800.

It should be understood that, FIG. 8 only illustrates a simplified design of the base station 800. In practical applications, the base station 800 may include any number of processors, controllers, memories, communication units, etc., and all access network devices that may be implemented in embodiments of the present disclosure are within the protection scope of embodiments of the present disclosure.

Those skilled may realize that in one or more examples, the functions described in embodiments of the disclosure may be implemented with a hardware, a software, a firmware and their combination. The functions may be stored in a computer readable storage medium or transmitted as one or more instructions or codes on a computer readable medium when implemented with a software. Computer-readable media include a computer storage medium and a communication medium, in which the communication medium includes any medium that facilitates transmission of a computer program from one place to another. A storage medium may be any available medium that may be accessed by a general purpose or special purpose computer.

Embodiments of the disclosure further provide a computer storage medium configured to store computer software instructions for use in the above base station, the instructions including a program designed to perform the above HARQ feedback method.

Embodiments of the disclosure further provide a computer storage medium configured to store computer software instructions for use in the above terminal, the instructions including a program designed to perform the above HARQ feedback method.

After considering the specification and practicing the disclosure herein, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims.

What is claimed is:

1. A hybrid automatic repeat request (HARQ) feedback method, performed by a terminal, comprising:
   receiving a power saving signal, wherein the power saving signal is configured to indicate the terminal to perform a power saving related action; and
   performing HARQ feedback based on a receipt result of the power saving signal,
   wherein the power saving related action comprises one of:
   in response to a data scheduling requirement, detecting and receiving a physical downlink control channel (PDCCH) for data scheduling during corresponding active time of the terminal; or
   in response to no data scheduling requirement, skipping detection and receipt of a PDCCH for data scheduling during corresponding active time of the terminal;
   wherein the active time is specific time of the terminal for monitoring PDCCH;
   wherein performing the HARQ feedback based on the receipt result of the power saving signal comprises one of the following:
   sending an acknowledge (ACK) feedback message to a base station in response to successfully receiving the power saving signal, and sending a non-acknowledge (NACK) feedback message to the base station in response to failing to receive the power saving signal;
   sending an acknowledge (ACK) feedback message to a base station in response to successfully receiving the power saving signal, and feeding back nothing to the base station in response to failing to receive the power saving signal;
   and
   feeding back nothing to a base station in response to successfully receiving the power saving signal, and sending a non-acknowledge (NACK) feedback message to the base station in response to failing to receive the power saving signal.

2. The method according to claim 1, wherein performing the HARQ feedback based on the receipt result of the power saving signal comprises:
   acquiring a physical uplink control channel (PUCCH) resource for performing the HARQ feedback for the power saving signal in response to determining to send a feedback message to a base station based on the receipt result of the power saving signal;
   acquiring a transmitting time point of the feedback message;
   acquiring, based on the PUCCH resource and the transmitting time point, an HARQ feedback resource used to perform the HARQ feedback for the power saving signal; and sending the feedback message to the base station on the HARQ feedback resource.

3. The method according to claim 2, wherein acquiring the PUCCH resource for performing the HARQ feedback for the power saving signal comprises:
   acquiring a set of PUCCH resources, wherein the set of PUCCH resources is a set containing PUCCH resources available to the terminal and configured through a higher layer signaling; and
   acquiring the PUCCH resource for performing the HARQ feedback for the power saving signal from the set of PUCCH resources based on at least one of a PUCCH resource indicator carried in the power saving signal and physical resource location information of the power saving signal.

4. The method according to claim 2, wherein acquiring the PUCCH resource for performing the HARQ feedback for the power saving signal comprises:
   acquiring the PUCCH resource for performing the HARQ feedback for the power saving signal configured for the terminal through a higher layer signaling.

5. The method according to claim 2, wherein acquiring the transmitting time point of the feedback message comprises:
   acquiring a reference time point, wherein the reference time point is an end time point of transmission of the power saving signal; and
   determining a time point after the reference time point and having a specified interval with the reference time point as the transmitting time point.

6. The method according to claim 5, wherein, the specified interval is one of the following:
   a preset time period;
   a time period configured through a higher layer signaling; and
   a time period carried in the power saving signal.

7. The method according to claim 1, wherein the power saving related action comprises the following:
   adjusting a communication related parameter, wherein the communication related parameter comprises at least one of a bandwidth value used by the terminal, a number of antennas used by the terminal, a number of candidate locations of PDCCH.

8. The method according to claim 1, wherein performing the HARQ feedback based on the receipt result of the power saving signal comprises:
   performing the HARQ feedback based on the receipt result of the power saving signal in a case that the power saving related action is a specified action, wherein the specified action is an action preconfigured in the terminal or an action configured by a base station.

9. A hybrid automatic repeat request (HARQ) feedback method, performed by a base station, comprising:
   sending a power saving signal to a terminal, wherein the power saving signal is configured to indicate the terminal to perform a power saving related action; and
   receiving a feedback message sent by the terminal when performing HARQ feedback for the power saving signal,
   wherein the power saving related action comprises one of:
   in response to a data scheduling requirement, detecting and receiving a physical downlink control channel (PDCCH) for data scheduling during corresponding active time of the terminal; or
   in response to no data scheduling requirement, skipping detection and receipt of a PDCCH for data scheduling during corresponding active time of the terminal;
   wherein the active time is specific time of the terminal for monitoring PDCCH;
   wherein performing the HARQ feedback for the power saving signal comprises one of the following:
   sending an acknowledge (ACK) feedback message to a base station in response to successfully receiving the power saving signal, and sending a non-acknowledge (NACK) feedback message to the base station in response to failing to receive the power saving signal;
   sending an acknowledge (ACK) feedback message to a base station in response to successfully receiving the power saving signal, and feeding back nothing to the base station in response to failing to receive the power saving signal;
   and
   feeding back nothing to a base station in response to successfully receiving the power saving signal, and sending a non-acknowledge (NACK) feedback message to the base station in response to failing to receive the power saving signal.

10. The method according to claim 9, wherein,
    an HARQ feedback resource used by the terminal to send the feedback message is a resource acquired based on a physical uplink control channel (PUCCH) resource used by the terminal to perform the HARQ feedback for the power saving signal and a transmitting time point of the feedback message.

11. The method according to claim 10, further comprising:
    configuring a set of PUCCH resources for the terminal through a higher layer signaling, wherein the set of PUCCH resources is a set containing PUCCH resources available to the terminal.

12. The method according to claim 10, further comprising:
    configuring, by a higher layer signaling, a PUCCH resource for the terminal for performing the HARQ feedback for the power saving signal.

13. The method according to claim 10, wherein the transmitting time point is a time point after a reference time point and having a specified interval with the reference time point;
    wherein the reference time point is an end time point of transmission of the power saving signal.

14. The method according to claim 13, wherein, the specified interval is one of the following:
    a preset time period;
    a time period configured for the terminal through a higher layer signaling; and
    a time period carried in the power saving signal.

15. The method according to claim 9, wherein the power saving related action comprises the following:
    adjusting a communication related parameter, wherein the communication related parameter comprises at least one of a bandwidth value used by the terminal, a number of antennas used by the terminal, a number of candidate locations of PDCCH.

16. The method according to claim 9, wherein receiving the feedback message sent by the terminal when performing HARQ feedback for the power saving signal comprises:
    receiving the feedback message sent by the terminal in a case that the power saving related action is a specified action;
    wherein the specified action is an action preconfigured in the terminal or an action configured by the base station for the terminal.

17. The method according to claim 9, further comprising:
performing a scheduling operation or a transmission adjustment operation corresponding to the power saving related action in a case that the feedback message indicates that the terminal successfully receives the power saving signal.

18. A hybrid automatic repeat request (HARQ) feedback apparatus, applicable in a terminal, and comprising:
a processor;
a memory configured to store instructions executable by the processor; wherein,
the processor is configured to:
receive a power saving signal, wherein the power saving signal is configured to indicate the terminal to perform a power saving related action; and
perform HARQ feedback based on a receipt result of the power saving signal,
wherein the power saving related action comprises one of:
in response to a data scheduling requirement, detecting and receiving a physical downlink control channel (PDCCH) for data scheduling during corresponding active time of the terminal; or
in response to no data scheduling requirement, skipping detection and receipt of a PDCCH for data scheduling during corresponding active time of the terminal;
wherein the active time is specific time of the terminal for monitoring PDCCH;
wherein the processor is configured to perform the HARQ feedback based on the receipt result of the power saving signal by:
sending an acknowledge (ACK) feedback message to a base station in response to successfully receiving the power saving signal, and sending a non-acknowledge (NACK) feedback message to the base station in response to failing to receive the power saving signal;
sending an acknowledge (ACK) feedback message to a base station in response to successfully receiving the power saving signal, and feeding back nothing to the base station in response to failing to receive the power saving signal;
and
feeding back nothing to a base station in response to successfully receiving the power saving signal, and sending a non-acknowledge (NACK) feedback message to the base station in response to failing to receive the power saving signal.

19. An HARQ feedback apparatus, applicable in a base station, and comprising:
a processor;
a memory configured to store instructions executable by the processor; wherein,
the processor is configured to perform the HARQ feedback method according to claim 9.

* * * * *